INVENTOR.
EDWIN S. LEE, III
BY
Christie, Parker & Hale
ATTORNEYS.

INVENTOR.
EDWIN S. LEE, III
BY
Christie, Parker & Hale
ATTORNEYS.

ASSOCIATIVE MEMORY EMPLOYING TRANSFLUXORS

Filed July 19, 1963

8 Sheets-Sheet 3

INVENTOR.
EDWIN S. LEE, III
BY
Christie, Parker & Hale
ATTORNEYS.

INVENTOR.
EDWIN S. LEE, III
BY
Christie, Parker & Hale
ATTORNEYS.

INVENTOR.
EDWIN S. LEE, III
BY
Christie, Parker & Hale
ATTORNEYS.

ASSOCIATIVE MEMORY EMPLOYING TRANSFLUXORS

Filed July 19, 1963

INVENTOR.
EDWIN S. LEE, III
BY
Christie, Parker & Hale
ATTORNEYS.

INVENTOR.
EDWIN S. LEE, III
BY
Christie, Parker & Hale
ATTORNEYS.

INVENTOR.
EDWIN S. LEE, III
BY
Christie, Parker & Hale
ATTORNEYS.

United States Patent Office 3,339,189

Patented Aug. 29, 1967

3,339,189
ASSOCIATIVE MEMORY EMPLOYING TRANSFLUXORS

Edwin S. Lee III, West Covina, Calif., assignor to Burroughs Corporation, Detroit, Mich., a corporation of Michigan Filed July 19, 1963, Ser. No. 296,266
21 Claims. (Cl. 340—174)

ABSTRACT OF THE DISCLOSURE

An associative memory utilizing a pair of transfluxors in combination with a switching element as the memory cells of the memory. All of the memory cells are arranged in rows and columns to simultaneously receive the corresponding bits of a word to be compared. The memory cells respond to the signal to be compared by causing the switching element thereof to assume a high or low impedance state. Simultaneous with the application of the word to be compared, a trigger circuit is activated and the trigger circuit is applied to the group of memory cells whereby it finds a low impedance path only through the output circuits of the memory cells storing a matching word.

This invention relates to storage apparatus and, more particularly, to a parallel comparator for simultaneously comparing a coded input word with a plurality of coded words stored in the comparator.

Circuits for simultaneously comparing a coded input word with a plurality of coded words stored by the circuit are well known. Such circuits are commonly termed content addressed memories. To provide such simultaneous comparison, these comparators generally include a plurality of cells arranged in information groups to store a plurality of coded words. Each cell is associated with a particular cell of each other information group. The cells are composed of one or more magnetic storage elements arranged to store a bit of a coded word. The magnetic storage elements of each information group include a common output winding and magnetic storage elements of associated cells in different groups including a common input winding. A coded input word is applied in parallel to the input windings for simultaneous comparison with the words stored by the comparator. If a match occurs between a bit of the coded input word and a bit of a stored word, magnetic flux switches within the storage element storing the bit to generate a predetermined voltage on the output winding for the associated information group. If a complete match occurs between each bit of the input word and a word stored in an information group, a discrete output signal is generated on the output winding for the information group. The discrete output signal differs in value from the output signal generated in an output winding associated with an information group storing a word which does not exactly match the input word. The discrete output signal is sensed to provide an indication of the location of the stored word matching the input word.

These comparators are particularly useful as a component of direct access memory systems of the type described in the co-pending patent application Ser. No. 780,056, filed Dec. 12, 1958, and assigned to the same assignee as the present invention. Such memory systems permit direct access to stored information in a memory portion of the system.

This type of equipment provides an accurate indication of a match between a stored word and an input word for coded words having a relatively small number of information bits. As the bit size of the coded words increase, however, the number of cells in each information group likewise increase with a corresponding decrease in the signal-to-noise ratio of the signals generated in the output windings of the system. This decrease in signal-to-noise ratio is a result of the noise fluxes adding up in a transfluxor memory element. Thus, in practice, presently existing equipment is limited both in size and in word comparing capacity.

In view of the above, the present invention provides a content addressed system which is uneffected by noise signals since the noise signals or noise fluxes are rejected in each memory cell by the provision of the threshold voltage of the base-emitter diode of the transistors and which may therefore be substantially larger and have a substantially greater word capacity than presently existing systems.

To accomplish this, the present invention comprises a plurality of cells of a novel design arranged in a unique pattern such that a coded input word may be simultaneously compared with a plurality of coded words stored by cells.

Briefly, each cell includes a magnetic logic section and a switch section. The magnetic logic section of each cell stores a bit of a coded word and generates electrical signals when a coded input signal is applied thereto. The electrical signals generated by the magnetic logic section control the state of the switch section. In particular, when the coded input signal matches the bit of the coded word stored in the magnetic logic section the switch section switches to either a predetermined high impedance or low impedance state in response to the electrical signal generated by the magnetic logic section. The switch section is in an opposite state in the absence of such a match. The switch section is not responsive to noise signals generated by the magnetic logic section and thereby renders the cells and, in turn, the memory system including the cell uneffected by noise signals.

In the system, the cells are arranged in a plurality of information groups with each cell being associated with a particular cell in each other information group. Each group stores a coded word with each cell of a group storing a bit of a coded word. An output circuit is associated with each information group and is coupled to the switch section of the cells comprising the associated group. An input lead is coupled in common to associated cells in each information group to simultaneously apply a different bit of a coded input word to the associated cells of the different information groups. A signal source is coupled in common to the output circuits.

In operation, the signal source is excited simultaneous with the applying of the bits of the coded input word in parallel to the input leads. When a match occurs between a bit stored in a cell and an input bit, the switch section of the associated cell switches to its predetermined impedance state to allow a current signal to pass the cell through the associated output circuit. When a match occurs between the input word and the word stored in an information group, a discrete current signal passes through the entire output circuit associated with the information group. Accordingly, the system of the present invention includes an array of novel cells arranged to provide an indication of a match condition between the coded input word and a coded stored word by the steering of a discrete current signal through the output circuit associated with the information group of cells storing the coded word which matches the coded input word.

The above as well as other features of the present invention may be more clearly understood by reference to the following detailed description when considered with the drawings, in which.

Figure 1:
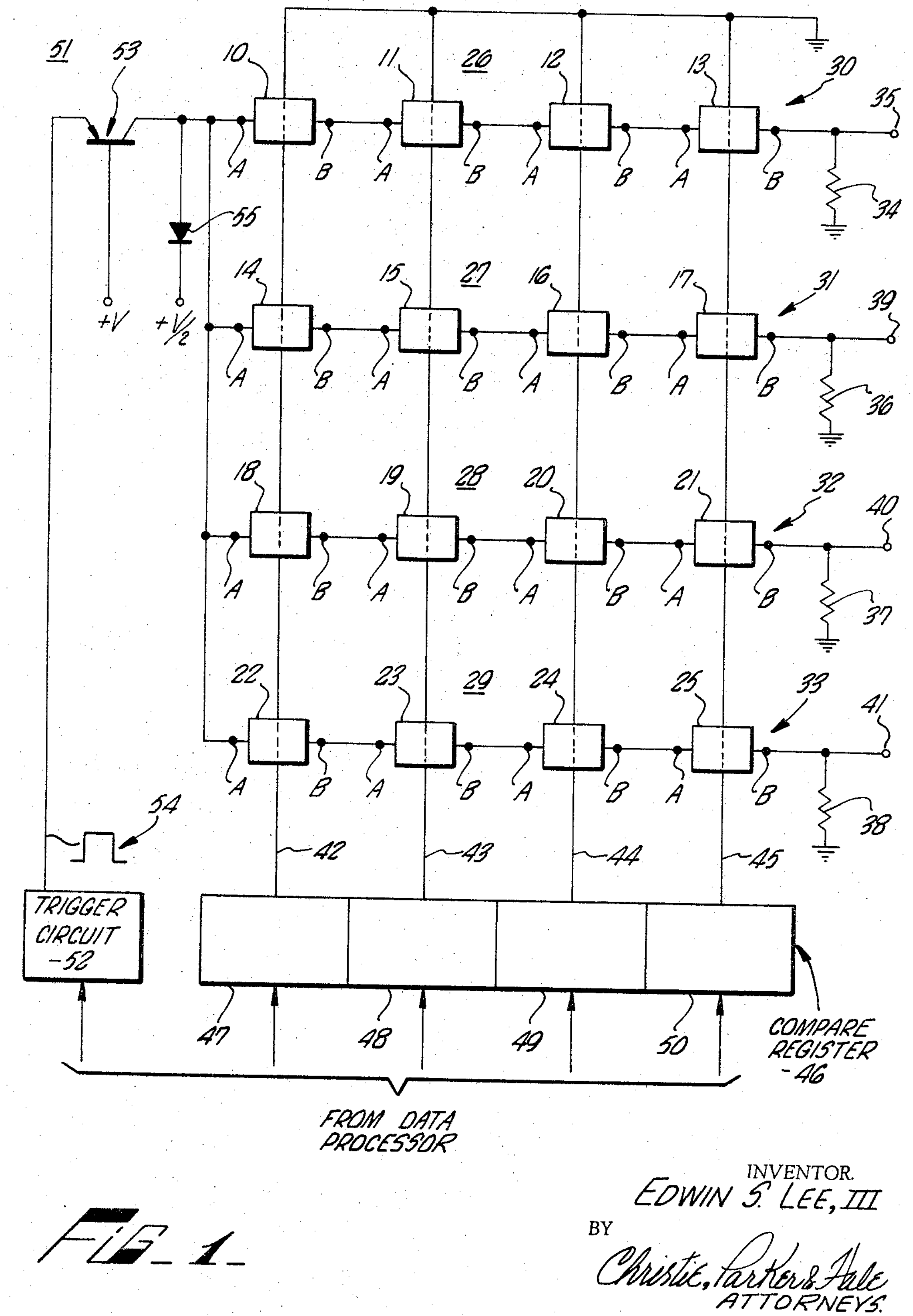
FIG. 1 is a schematic-block diagram representation of one form of content addressed memory embodying the present invention.
Figure 2:
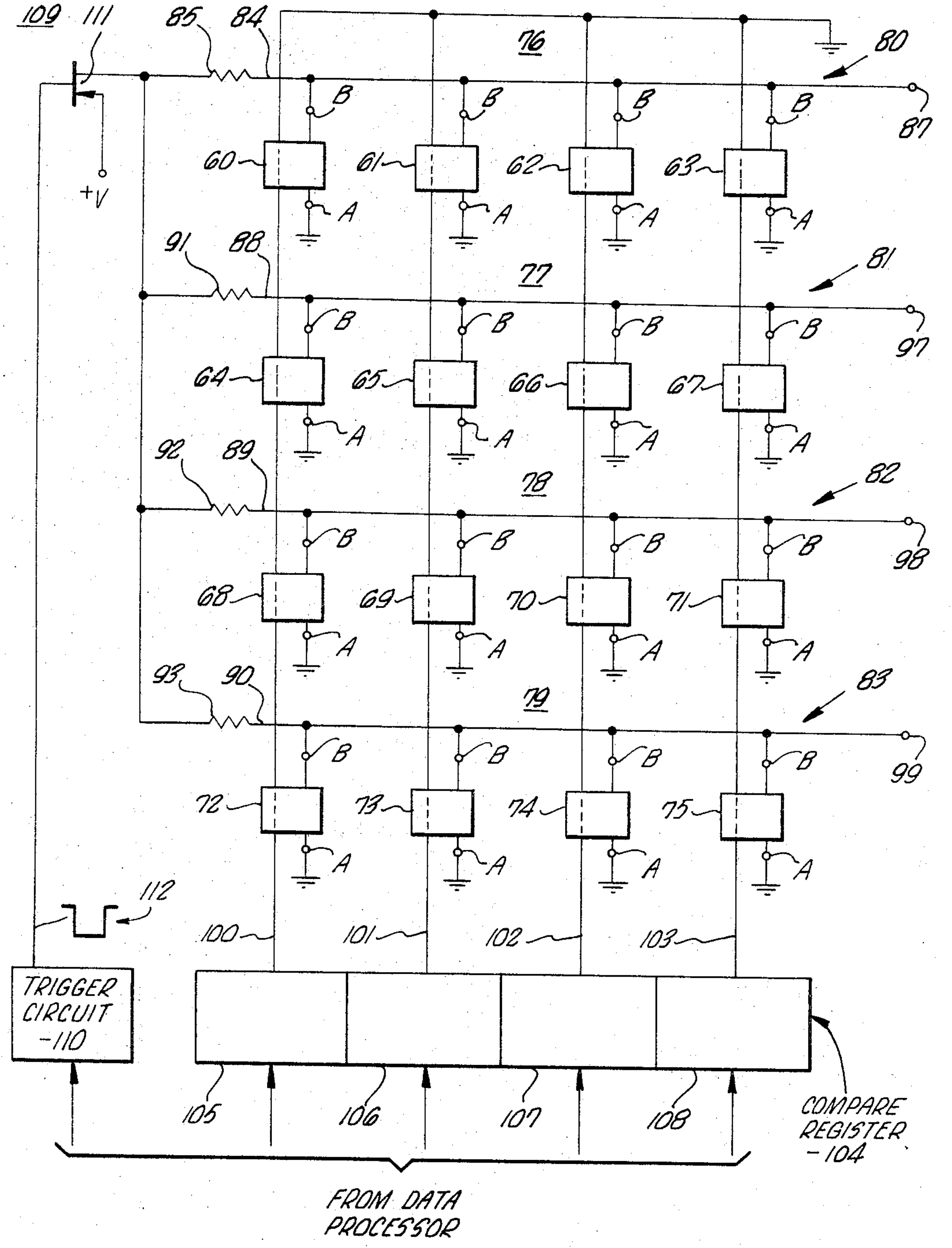
FIG. 2 is a schematic-block diagram representation of another form of content addressed memory embodying the present invention.
Figure 3:
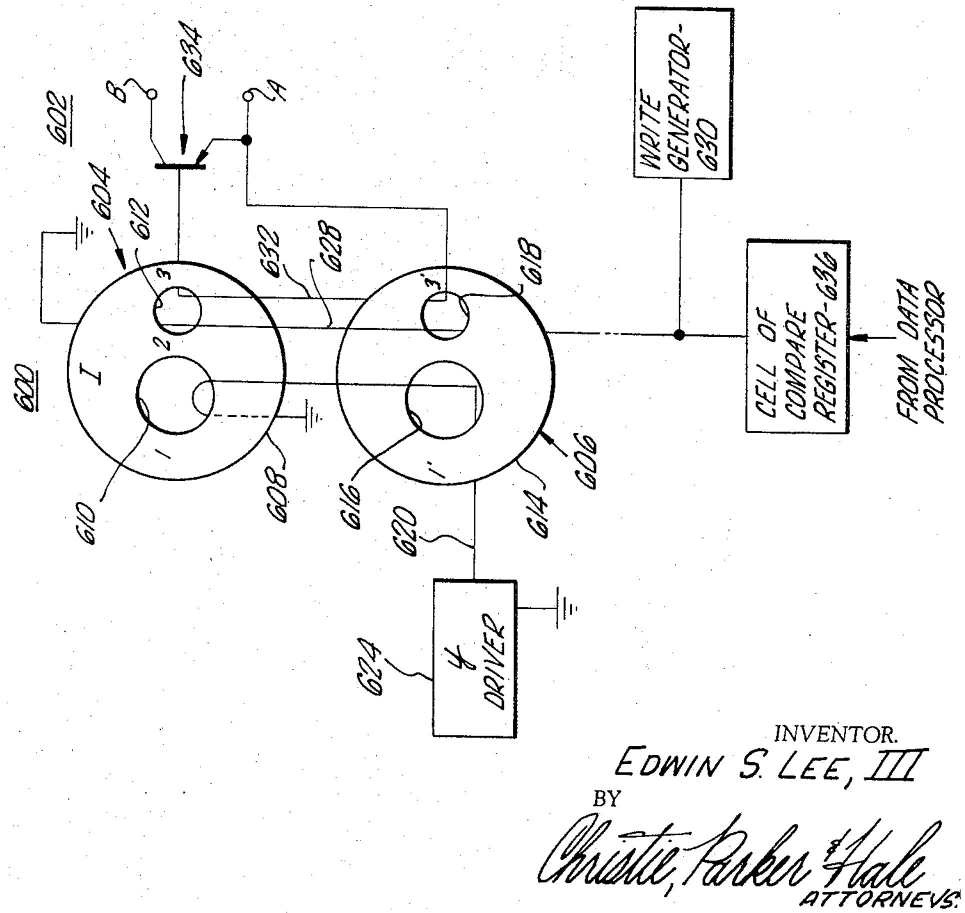
FIG. 3 is a schematic-block diagram representation of a memory cell employing a pair of transfluxors for use in the systems of FIGS. 1 and 2.
Figure 5A:
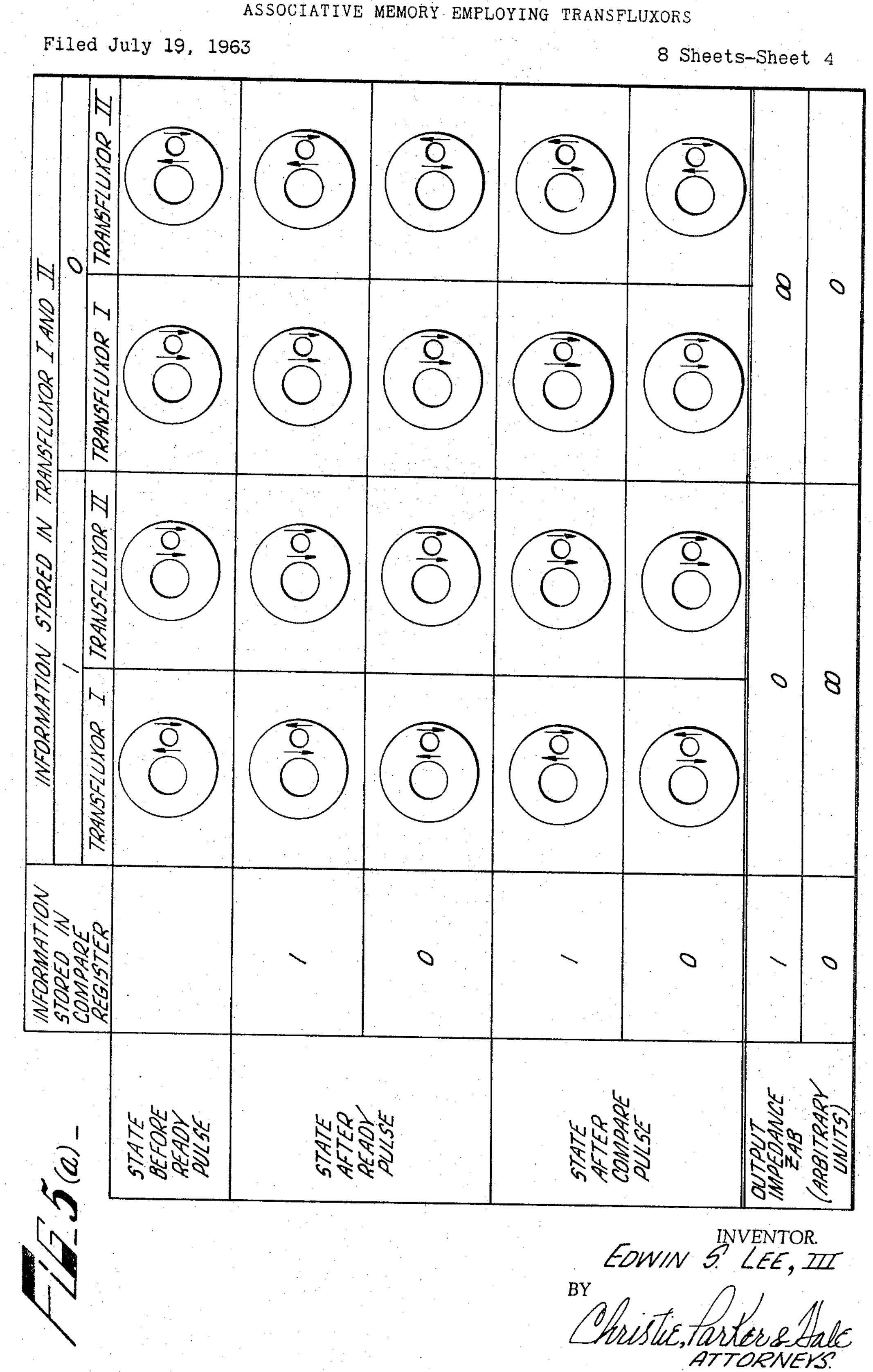
Figure 5B:
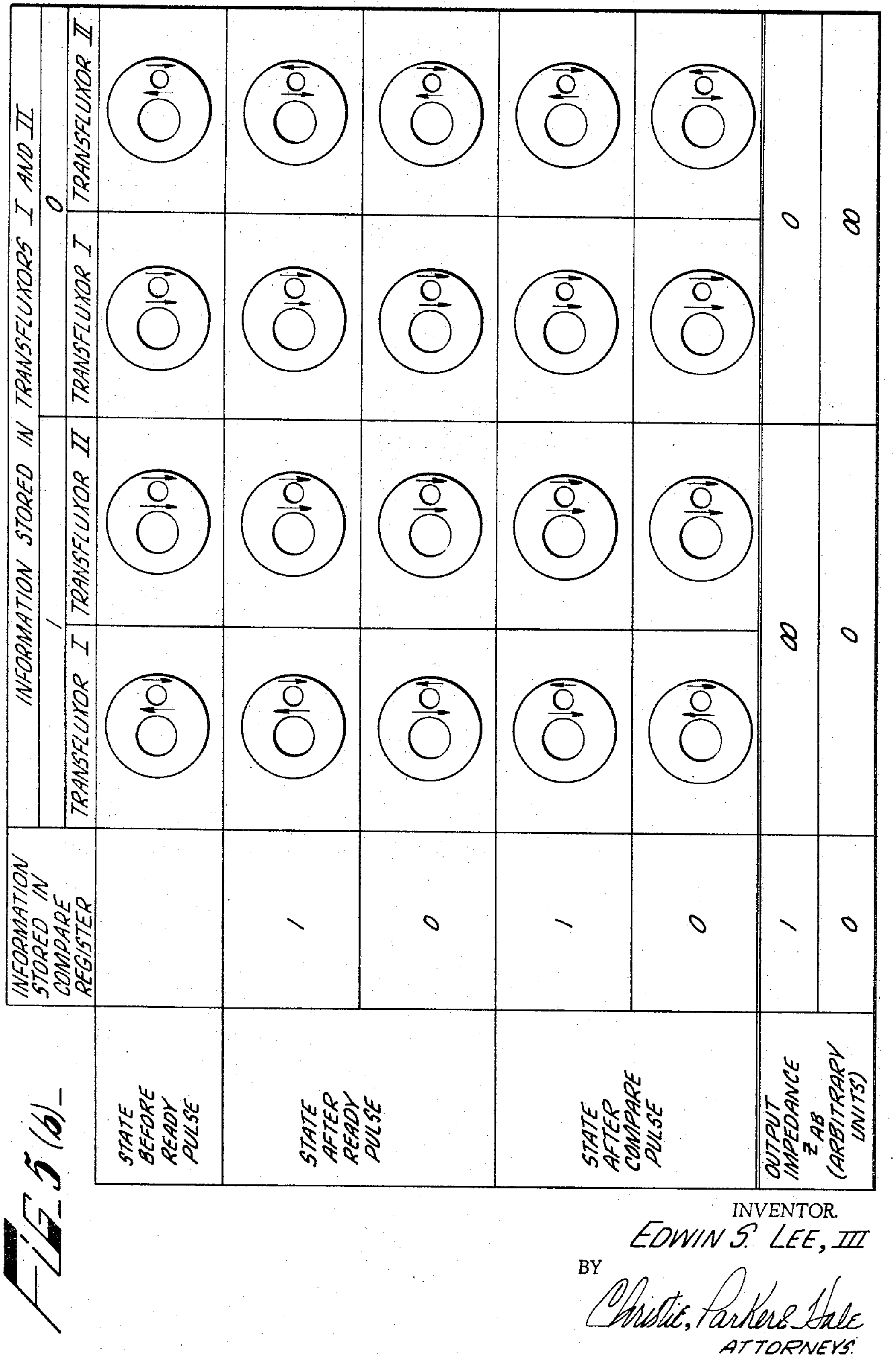
Figure 7:
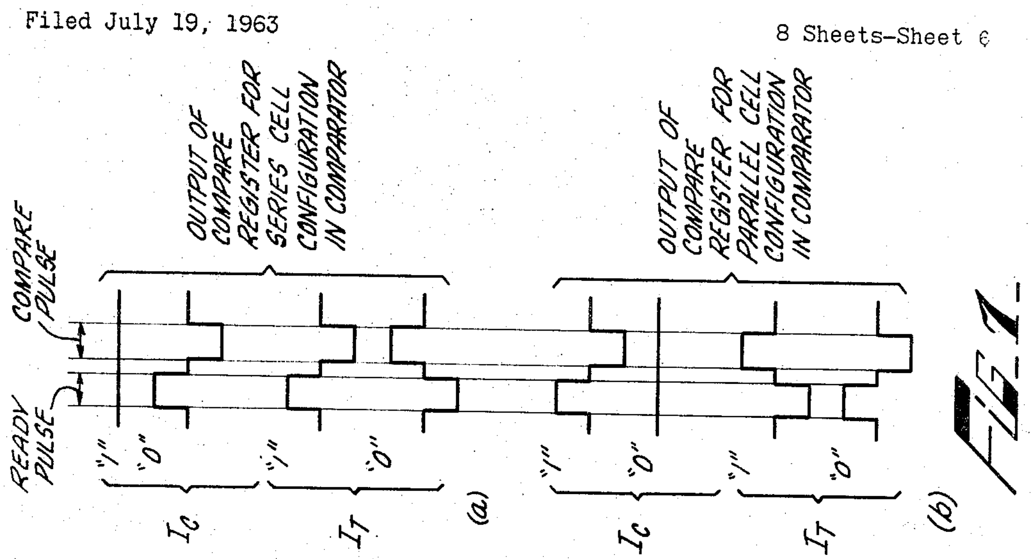
Figure 6:
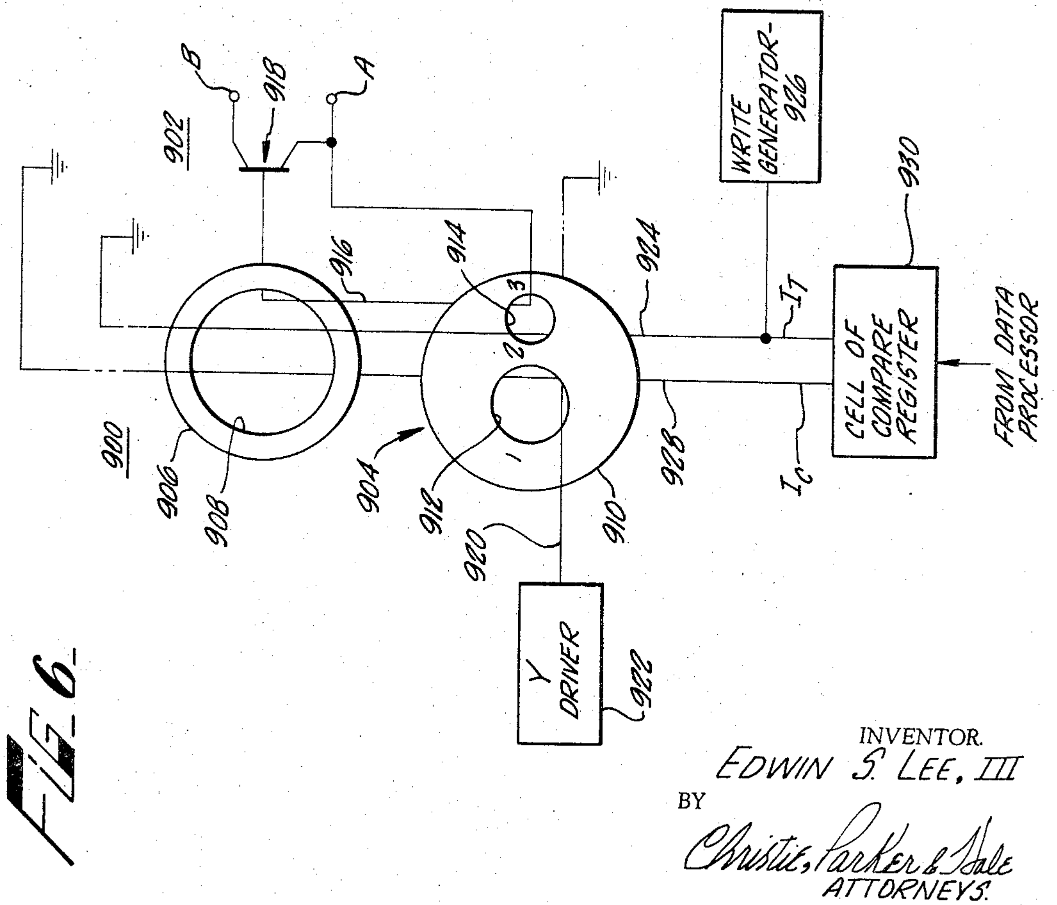
Figure 8A:
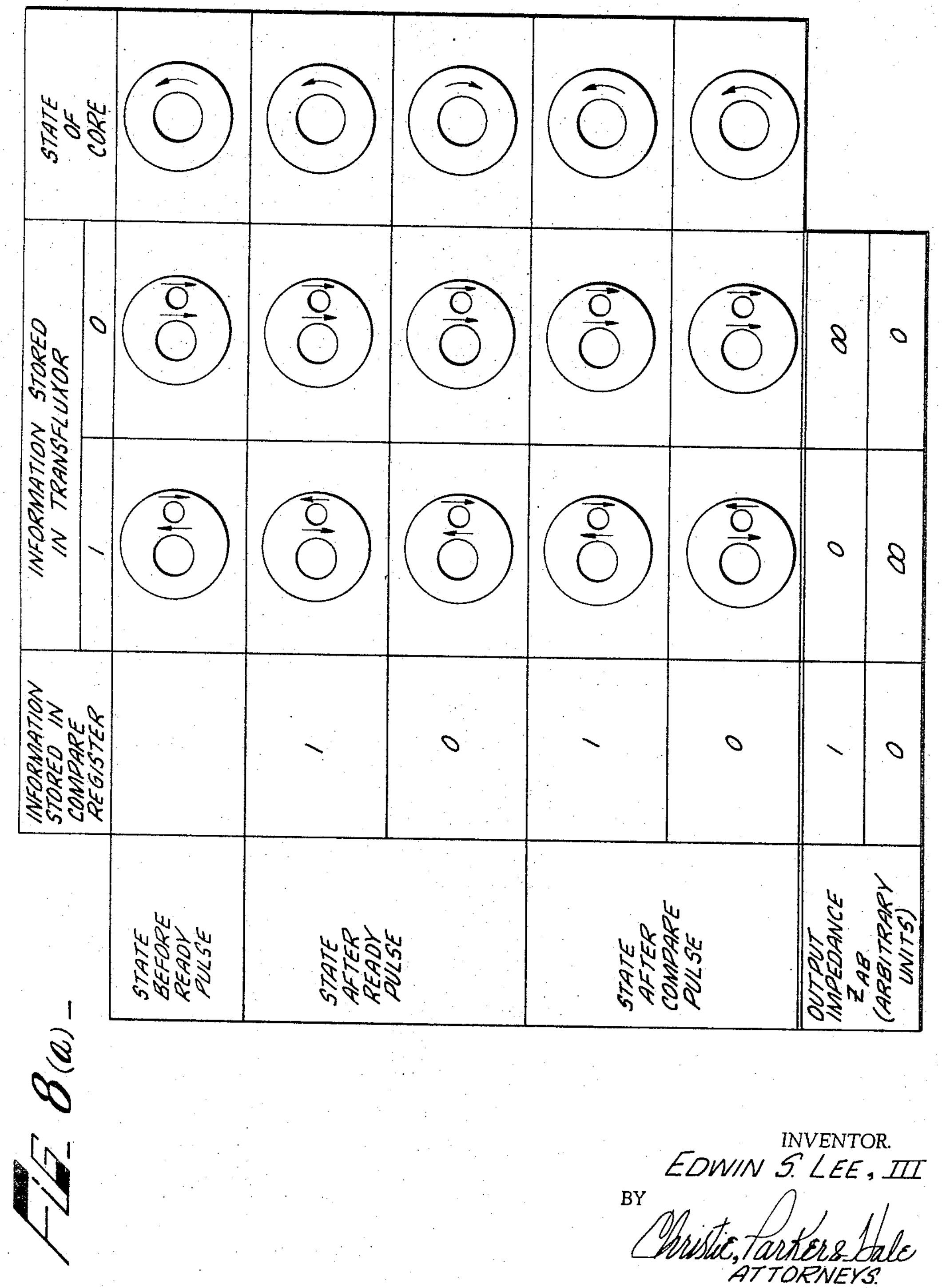
Figure 8B:
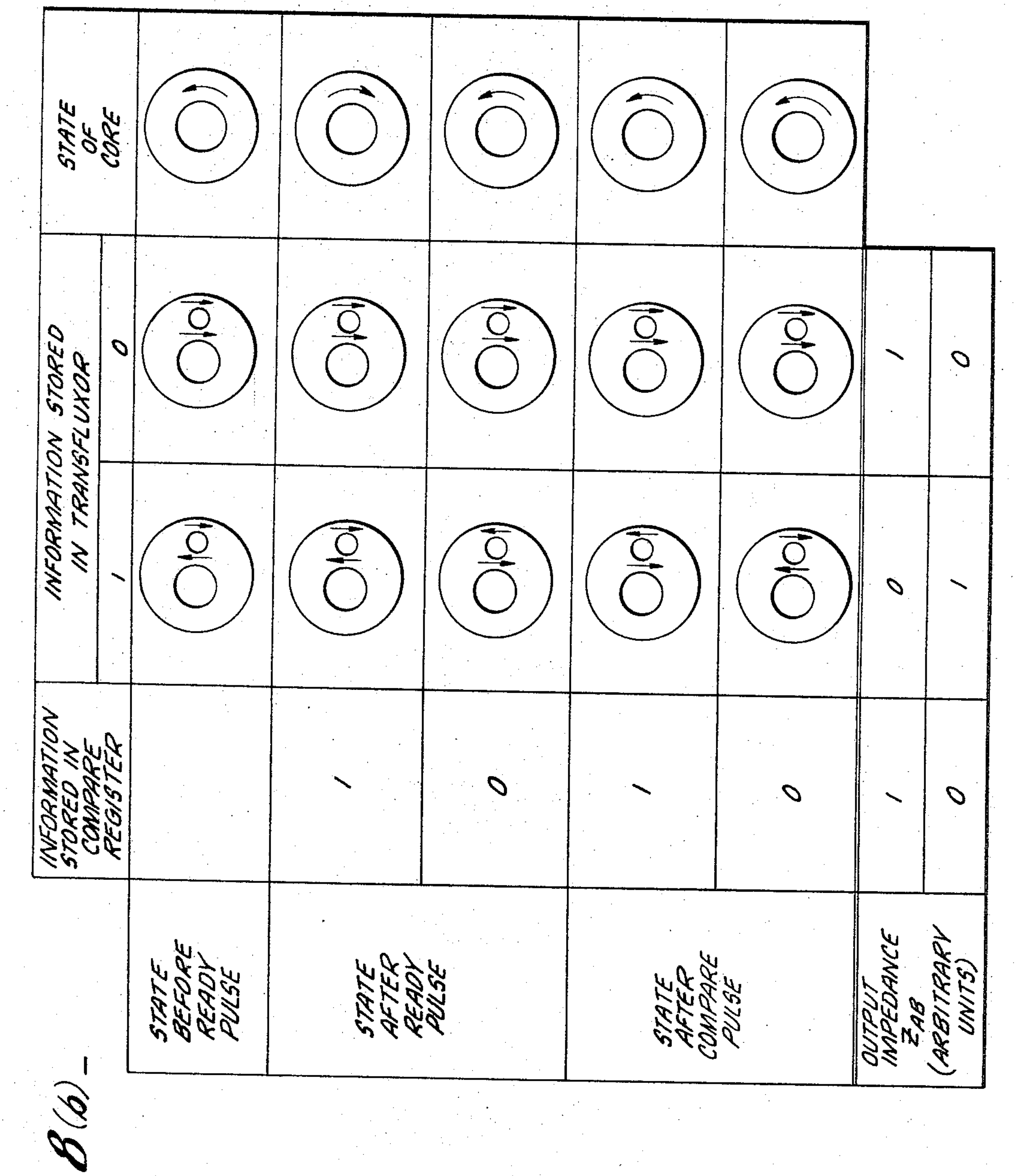

FIGS. 5 (*a*) and (*b*) are charts illustrating the conditions of the transfluxors represented in FIG. 3 and the impedance state of the cell when included in the systems illustrated in FIGS. 1 and 2, respectively;

FIG. 6 is a schematic-block diagram representation of another form of memory cell employing a transfluxor and a core;

FIG. 7 is a schematic representation of the signal waveforms of the signals generated by the compare register for the cell illustrated in FIG. 6; and FIGS. 8 (*a*) and (*b*) are charts illustrated in the conditions of the transfluxor and core illustrated in FIG. 6 and the impedance state of the cell when included in the systems illustrated in FIGS. 1 and 2, respectively.

As briefly described, the present invention includes a plurality of memory cells arranged in a pattern such that a coded input word may be simultaneously compared with a plurality of coded words stored by the combination of the cells. The pattern of memory cells is illustrated in FIGS. 1 and 2.

Various specific cell designs may be employed as the memory cells and will each be described in detail hereinafter. For the present a general understanding of the basic features of the memory cells is sufficient.

Basically, each memory cell includes a magnetic logic section and a switch section. The magnetic logic section of each cell includes at least one magnetic storage element for storing a bit of a stored word. An input winding links the magnetic storage element and is arranged to receive an input signal indicative of a bit of a coded input word. An output winding is coupled to the switch section and links the magnetic storage element. The magnetic storage element is arranged to induce predetermined electrical signals in the output winding in response to the input signals applied to the input winding. The switch section of each cell includes a pair of output terminals A and B and is characterized by having a high impedance and a low impedance state. In its high impedance state, a high impedance or effective open circuit condition exists between the terminals A and B. When the switch section is in its low impedance state, a low impedance or effective short circuit condition exists between the terminals A and B. The switch section is responsive to the electrical signals induced in the output winding of an associated magnetic section to switch between its high and low impedance states. The switch section is arranged to be in a predetermined one of its impedance states in response to a signal induced in the associated output winding when the value of the input signal applied to the input winding of the associated magnetic section matches the value of the bit of the coded word stored by the associated magnetic section. When the value of the input signal does not match the value of the bit stored in the associated magnetic section, the switch section is in its other impedance state. The switch section of each cell is not responsive to noise signals induced in the output winding of the associated magnetic section. Thus, the cell designs of the present invention are not affected by noise signals and when employed in a content addressed memory system allow the system to be substantially larger and have a substantially greater word storing and comparing capacity than prior art systems.

By way of example only, the combination of the cells of the present invention will be described in terms of binary coded input and stored words. Thus, each cell is arranged to selectively store a bit of a binary coded word in its magnetic logic section and is arranged to be responsive to electrical signals indicative of the binary value of a bit of a binary coded input word to switch its associated switch section between its high and low impedance states.

Referring specifically to FIG. 1, the illustrated memory system includes a plurality of cells 10–25 inclusive. The cells are arranged, by way of example only, in four information groups 26, 27, 28, and 29, each including four cells. The information group 26 includes the cells 10–13. The information group 27 includes the cells 14–17. The information group 28 includes the cells 18–21, while the information group 29 includes the cells 22–25. Each cell is associated with a particular cell in each other information group. For example, the cell 10 is associated with the cells 14, 18, and 22 of the information groups 27, 28, and 29, respectively. Each information group stores a binary coded word of four bits. Each bit of a binary coded word so stored by a different cell. Thus, for example, the information group 26 may store the binary coded word 1101 with the cells 10, 11, and 13 each storing a different bit of a binary one value and the cell 12 storing a bit of a binary zero value.

The binary coded words are selectively stored in the memory by a first binary input means. The first binary input means is not specifically shown in either FIGS. 1 or 2 in order to simplify the circuit arrangement. The first binary input means varies in its detailed design for each specific design of the cell, as will become evident hereinafter. For this reason, the first binary input means is described in detail in connection with the description of the specific cell designs. For the description of FIGS. 1 and 2 it will be assumed that binary coded words are already stored in each of the information groups by the first binary input means. Generally, a different binary coded word will be stored in each of the information groups.

The memory system illustrated in FIG. 1 includes a plurality of output circuits 30, 31, 32, and 33. A separate output circuit is associated with each information group. Thus, the output circuit 30 is associated with the information group 26 while the output circuit 33 is associated with the information group 29. The output circuit 30 comprises a series connection of the switch sections of each of the cells 10, 11, 12, and 13. In particular, the output terminals B of the cells 10, 11 and 12 are coupled to the output terminals A of the cells 11, 12, and 13, respectively. The output terminal B of the cell 13 is coupled through a resistor 34 to a source of reference potential illustrated as ground and to an output terminal 35 for the output circuit 30. Each of the remaining output circuits 31, 32, and 33 are similarly arranged and each include a series connection of the switch sections of the cells comprising the associated information groups. Similarly, the remaining output circuits include resistors 36, 37, and 38 and output terminals 39, 40, and 41, respectively. Each of the resistors 36–38 is coupled between the associated output terminal and ground. Due to the series connection of the switch sections of the cells comprising each information group, the cells 10–25 comprising the memory system illustrated in FIG. 1 may be considered as being arranged in a series configuration.

The memory system of the present invention includes a plurality of input circuits. Each input circuit includes a series connection of the input windings of associated cells in the different groups of cells. Thus, the system illustrated in FIG. 1 includes four input circuits 42, 43, 44, and 45. The input circuit 42 is associated with and includes the input windings of the cells 10, 14, 18, and 22. The input circuit 43 is associated with and includes the input windings from the cells 11, 15, 19, and 23. The input circuit 44 is associated with and includes the input windings of the cells 12, 16, and 24, while the input circuit 45 is associated with and includes the input windings of the cells 13, 17, 21, and 25. The input circuits are coupled in common to ground after passing through the associated series of cells.

The input circuits 42, 43, 44, and 45 comprise an integral part of a second binary input means for applying input signals indicative of the binary value of different bits of a binary coded input word to each cell of the different information groups. In addition to the input circuits, the second binary input means includes a compare register 46 having a plurality of cells 47, 48, 49, and 50. The cells of the compare register 46 are of different design for each of the cell designs which may be employed in the systems of the present invention. For the present it is sufficient to state that each cell of the compare register 46 includes one or more bidirectional current generators responsive to a bit of a binary coded input word from an associated data processor for generating predetermined current signals indicative of the binary value of the input bit. Thus, if a bit of a binary zero value is supplied to the cell 47 of the compare register 46, the cell 47 generates a predetermined current signal indicative of the binary zero value of the input signal applied thereto. Similarly, if a bit of a binary one value is applied to the cell 47 a different predetermined current signal is generated thereby. The current signals generated by the compare register 46 are applied simultaneously and in parallel to the input circuits 42, 43, 44, and 45, which are coupled to the cells 47, 48, 49, and 50, respectively. Since the input circuits 42–45 each include the input windings of associated cells of the different information groups, input signals indicative of the binary value of a different bit of a binary coded input word are simultaneously applied to each cell of the different information groups.

As previously indicated with regard to the basic construction of each of the plurality of cells of the memory system, the input signals applied to the input windings control the impedance state of the switch section of the associated cells in accordance with the binary value of the bit of information stored in the magnetic section of the cell. As discussed, when the binary value of the input signal matches the binary value of the bit stored in the magnetic section of a cell, an electrical signal is induced in the output winding of the cell causing the switch section to be in a predetermined one of its impedance states. In the series configuration of cells illustrated in FIG. 1, the predetermined impedance state is the low impedance state. Thus, if the binary value of an input signal applied to a cell matches the binary value of the bit of information stored in the cell, the switch section of the cell is in its low impedance state. If the input signal does not match the stored bit of information the switch section is in its high impedance state. Thus, in the series configuration of cells, a series path is provided for a current signal through the series connected low impedance paths provided by each output circuit if and only if each bit of the word stored by the cells associated with the output circuit matches its associated bit of a binary coded input word applied to the compare register 46. Assuming that each information group stores a different binary coded word, and assuming that the information group 26 stores the binary coded word 1101, if the binary coded input word is also 1101, the switch section of each of the cells 10–13 assumes a low impedance state to provide a series path for a current signal through the entire output circuit 30 to produce a predetermined voltage signal at the output terminal 35. Since the remaining information groups each store a different binary coded word, a mismatch occurs in at least one cell of each information group. Thus, the switch section of at least one cell in each of the remaining information groups assumes a high impedance state to effectively block series current flow through the output circuit associated with the information group.

In the memory system illustrated in FIG. 1, a signal source 51 is coupled in common to each of the output circuits 30, 31, 32, and 33. The signal source includes a trigger circuit 52 and a transistor 53. The trigger circuit 52 may be a monostable multivibrator responsive to an electrical signal from the associated data processor for producing a current pulse having a waveform illustrated as the pulse 54. The output of the trigger circuit 52 is coupled to the emitter of the transistor 53. The transistor 53 is a PNP type transistor arranged with its base connected to a positive potential, shown at +V and with its collector terminal coupled in common to the plurality of output circuits 30–33. The collector terminal is also coupled through a diode 55 to ground. The transistor 53 is normally in a nonconductive state and switches to a conductive state in response to the current pulse generated by the trigger circuit 52. The trigger circuit 52 receives an electrical signal from the data processor substantially simultaneous with the application of the binary coded input word to the compare register 46. The trigger circuit 52 is arranged to generate a current pulse substantially simultaneous with the application of the input current signals to the input circuits 42–45. Thus, as the switch section of each cell assumes one of its impedance states, a current signal is generated by the trigger circuit 52, and is conducted through transistor 53, and applied in common to each of the output circuits 30–33. If a match occurs between a binary coded word stored by one of the information groups and the binary coded input word applied to the compare register, eacht cell in the information group storing the matching word assumes a low impedance state to provide a series path for the current signal amplified by the transistor 53. The current signal passes through the output circuit associated with the information group and develops a voltage signal of a predetermined magnitude at the output terminal associated with the information group. If the remaining information groups store different binary coded words a different voltage signal appears at the remaining output terminals. Thus, a discrete voltage signal is developed at the output terminal of the information group storing a matching coded word. In this manner, a match between a coded input word and a coded stored word is indicated by the steering of a current signal through an output circuit associated with an information group of cells storing the coded word which matches the coded input word.

If none of the stored words match the coded input word the current pulse generated by the trigger circuit passes through the diode 55 to $+V/2$, the diode 55 acting to clamp the voltage at the collector terminal of the transistor 53 when in a conductive state.

The memory system illustrated in FIG. 2 is somewhat similar to the one illustrated in FIG. 1 and includes a plurality of cells 60–75. The cells are arranged in four information groups 76, 77, 78, and 79 of four cells each. The cells 60–63 are included in the information group 76. The cells 64–67 are included in the information group 77. The cells 68–71 are included in the information group 78, while the cells 72–75 are included in the information group 79. Each cell is associated with a different cell of each information group. Thus, for example, the cell 60 is associated with the cells 64, 68, and 72 of the information group 77, 78, and 79, respectively. Similarly, the cell 63 of the information group 76 is associated with the cells 67, 71 and 75 of the information groups 77, 78, and 79.

In the same fashion as the system illustrated in FIG. 1, each information group stores a binary coded word, each bit of each word being stored by a different cell. Thus, for example, if the information group 76 stores a binary coded word 1101, the cells 60, 61, and 63 store different bits of a binary one value while the cell 62 stores a bit of a binary zero value.

The binary coded words are stored in the information groups by a first binary input means, not shown. As previously mentioned, the actual design of the first binary input means varies with the different designs of the cells included in the memory system illustrated in FIG. 2. Therefore, for simplicity, the first binary input means is not shown in the drawing of FIG. 2 but is rather illustrated and described in detail in connection with the description of each of the different cell designs. Therefore, for the description of FIG. 2 it will be assumed that a different binary coded word is stored in each of the information groups 76–79.

The memory system includes a plurality of output circuits 80, 81, 82, and 83. An output circuit is associated with each information group. For example, the output circuit 80 is associated with the information group 76, while the output circuit 83 is associated with the information group 79. Each output circuit includes an output lead and a series resistor coupled between an output terminal. Thus, the output circuit 80 includes an output lead 84, a series resistor 85, and an output terminal 87. Similarly, the output circuits 81, 82, and 83 include output leads 88, 89, and 90, series resistors 91, 92, and 93, and output terminals 97, 98, and 99, respectively. The series resistors 85, 91, 92, and 93 are of equal value.

The switch section of the cells comprising each information group are coupled in parallel between the output and the series resistor. Thus, in the information group 76, the switch section of the cells 60, 61, 62, and 63 are coupled between the output lead 84 and ground—the output terminal B of each switch section being coupled to the output lead 84 and the output terminal A being coupled to ground.

A similar parallel connection is provided for the switch sections of the cells comprising each of the remaining information groups. Thus, the cell configuration illustrated in FIG. 2 may be termed a parallel cell configuration.

The memory system of FIG. 2 also includes a plurality of input circuits 100, 101, 102, and 103. Each input circuit includes a series connection of the input winding of different associated cells in the different information groups. Thus, for example, the input circuit 100 includes the input windings of the cells 60, 64, 68, and 72 while the input circuit 103 includes the input windings of the cells 63, 67, 71, and 75. The input circuits are coupled in common to ground after passing through the associated group of cells.

The input circuits 100–103 comprise a component of a second binary input means. In addition to the input circuits, the second binary input means includes a compare register 104 having a plurality of cells 105, 106, 107, and 108 associated with the input circuits 100–103, respectively. Similar to the compare register 46 illustrated in FIG. 1, the cells of the compare register 104 are of a different specific design for each of the cell designs employed in the system. It is sufficient here to state that each cell basically includes at least one bidirectional current generator for producing a current signal indicative of the binary value of an input signal applied thereto from a data processor.

The cells 105–108 of the system 104 are arranged to receive a binary coded input word from a data processor, each bit of the input word being received by a different cell. When a bit of a binary one value is applied to the cell 105, the bidirectional current generator included therein is energized to generate a predetermined current signal indicative of the binary one value. When a bit of a binary zero value is applied to the cell 105, a different predetermined current signal is generated thereby. The current signals generated by the cells of the compare register 104 are applied simultaneously to the input circuits 100–103. Due to the series connection of the input circuits 100–103, input signals indicative of the binary value of different bits of a binary coded input word are simultaneously applied to the different cells of each of the information groups for comparison with the bits of binary information stored therein. In this manner, a binary coded input word is simultaneously compared with the plurality of stored binary coded words.

As previously described, when the binary value of an input signal matches the binary value of a bit of information stored in a cell, the switch section of the cell assumes a predetermined one of its impedance states. For the parallel configuration of cells illustrated in FIG. 2, the predetermined state is the high impedance state of the switch section. Thus, when the binary value of an input signal applied to a cell matches the binary value of the bit stored by the cell, the switch section of the cell assumes its high impedance state. Therefore, if each bit of a stored binary coded word matches the corresponding bit of a binary coded word applied to the compare register 104, the switch section of each cell comprising the information group storing the matching binary coded word is in its high impedance state. If one of the bits of a stored word does not match a corresponding bit of the binary coded input word, the switch section of the mismatching cell is in a low impedance state. Thus, a voltage pulse is developed on an output lead only when an exact match occurs between the binary coded word stored by the associated information group and the binary coded input word.

In FIG. 2, a signal course 109 is coupled in common to each of the output leads 84, 88, 89, and 90. The signal source 109 includes a transistor 111 and a trigger circuit 110 for receiving a signal from the data processor. The trigger circuit 110 may comprise a monostable multivibrator for generating a current signal having a waveform illustrated at 112. The output of the trigger circuit 110 is coupled to the base of the transistor 111. Transistor 111 is a PNP type transistor arranged with its emitter connected to a positive potential, +V, and with its collector terminal coupled in common to the series resistors 85, 91, 92, and 93.

In operation, the trigger circuit 110 receives an electrical signal from the data processor substantially simultaneous with a binary coded input word being applied to the compare register 104. The trigger circuit 110 is arranged to generate a voltage pulse substantially simultaneous with the input signals being applied to the input circuits 100–103. The transistor 111 is normally in a nonconductive state. In response to the negative pulse generated by the trigger circuit 110, the transistor 111 switches to a conductive state so that its collector and emitter are at essentially the same potential. If the binary coded word stored by an information group exactly matches the binary coded input word, the cells comprising the information group are in a high impedance state and the voltage at the collector of transistor 110 appears at the output terminal of the word. Since different binary coded words are stored by the remaining information groups, at least one of the cells of the remaining information groups is in a low impedance state. When a cell is in a low impedance state, the associated output lead is effectively grounded at the interconnection of the switch section of the cell to the output lead so that voltage cannot be developed at the output of the word in which that cell is located. Therefore, a discrete voltage signal is developed only at the output terminal of an output circuit associated with an information group storing a binary coded word which exactly matches the binary coded input word applied to the compare register 104. In this manner, the system of FIG. 2 also indicates a match between a coded input word and a coded stored word by producing a discrete output voltage.

As previously pointed out, the cells comprising the systems illustrated in FIG. 1 may be of different design. The basic features common to each design have been previously described. The specific cell designs will be described in connection with FIGS. 3–9.

Referring to FIG. 3 wherein the illustrated cell includes a magnetic logic section 600 and a switch section 602. The magnetic logic section includes a pair of transfluxors 604 and 606 such as described in detail in the March 1956 Proceedings of the IRE at pages 321–332. The transfluxor 604 bears a notation I, while the transfluxor 606 bears the notation II. As illustrated, the transfluxor 604 includes a magnetic core element 608 having a substantially rectangular hysteresis characteristic. The core element 608 includes a plurality of apertures 610 and 612 so arranged and proportioned to define three magnetic legs in the core element shown as legs 1, 2, and 3. The aperture 610 is considerably larger than the aperture 612 and is positioned adjacent the left-hand side of the core element 608 as to define leg 1 while the aperture 612 is positioned inwardly of the right edge of the core element 608 to define legs 2 and 3 on opposite sides thereof. The aperture 612 is arranged in proportion so that legs 2 and 3 are substantially equal in cross-section while the aperture 610 is proportioned so that the cross-section on leg 1 is equal to or greater than the sum of those of the legs 2 and 3.

Multiple flux paths may then be placed around the apertures 610 and 612. One flux path extends between legs 1 and 2 around the aperture 610, another flux path extends around the aperture 612 in legs 2 and 3 while a third flux path extends between legs 1 and 3 around the apertures 610 and 612.

Similarly the transfluxor 606 includes a magnetic core element 614 having a substantially rectangular hysteresis characteristic. The core element 614 includes a plurality of apertures 616 and 618 similar to the apertures 610 and 612 in the core element 608. The apertures 616 and 618 are arranged in proportion to define three magnetic legs in the core element shown as legs 1′, 2′, and 3′. The aperture 616 is considerably larger than the aperture 618 and is positioned adjacent to the left-hand side of the core element 614 as to define leg 1′ while the aperture 618 is positioned inwardly of the right edge of the core element 614 to define legs 2′ and 3′ on opposite sides thereof. The aperture 618 is arranged in proportion so that legs 2′ and 3′ are substantially equal in cross-section, while the aperture 616 is proportioned so that the cross-section of the leg 1′ is equal to or greater than the sum of those of legs 2′ and 3′.

Multiple flux paths may then be traced around the apertures 616 and 618. One flux path extends between legs 1′ and 2′ around the aperture 616, another flux path extends aorund the aperture 618 and legs 2′ and 3′, while a third flux path extends between legs 1′ and 3′ around the apertures 616 and 618.

By controlling the direction of magnetic flux within the legs of each transfluxor the magnetic logic sections 600 stores a binary one or a binary zero bit of a coded word. Selective control over the direction of magnetic flux within the legs of the transfluxors is provided by a binary input means. The binary input means comprises a drive winding 620 interlacing the large apertures 610 and 616 of both the cores 608 and 614 and is coupled between a signal source represented in block form as the Y driver 624 and ground. When the content addressed system comprises a plurality of cells of the type illustrated in FIG. 3, the drive winding 620 passes in a similar manner through the large apertures of each cell in an associated information group.

The binary input means also includes a compare winding 628. The compare winding passes through the small apertures 616 and 612 of the transfluxors 606 and 614, respectively, in opposite directions. When utilized in the described memory systems, the compare winding 628 passes in a like manner through the small apertures of transfluxors I and II of associated cells in the different information groups. The compare winding 628 is coupled to ground and to a signal source represented in block form as a write generator 630.

The binary input means selectively stores a binary one or a binary zero in the magnetic logic section 600 by selectively blocking and unblocking the transfluxors 606 and 604. A blocked state is defined as a state wherein an alternating signal applied to the compare winding 628 does not produce an alternating magnetic flux about the small aperture of a transfluxor. An unblocked state is defined as a magnetic state for a transfluxor wherein an alternating signal applied to the compare winding 628 produces an alternating magnetic flux about the small aperture of the transfluxor. By way of example only, for the cell illustrated in FIG. 3 it will be assumed that a bit of a binary one value is stored in the magnetic logic section 600 when the transfluxor 604 is unblocked and the transfluxor 606 is blocked and that a bit of a binary zero value is stored by the magnetic logic section when the transfluxor 604 is blocked and the transfluxor 606 is unblocked.

To provide such selective storing of a bit of a binary value in the magnetic logic section 600, the Y driver is excited to initially develop intense current pulses in the drive winding 620. The intense current pulses produce a clockwise flow of flux through the legs 1, 2, and 3 of the core element 608 and through the legs 1′, 2′, and 3′ of the core element 614. The legs 2 and 3 and 2′ and 3′ are saturated. This is possible since the larger legs 1 and 1′ provide the necessary magnetic flux return paths. The legs 2 and 3 and 2′ and 3′ remain saturated after the termination of the initial pulses since the remnant and saturated inductions in the magnetic core elements 608 and 614 respectively are almost equal.

Both of the transfluxors 604 and 606 are blocked. Thus, if a signal is generated by the write generator 630 and applied to the compare winding 628 to produce an alternating magnetomotive force along the path surrounding the small apertures 612 and 618 but of insufficient magnitude to produce a flux change about the large apertures 610 and 616, the magnetomotive force will have, during one phase, a clockwise sense intending to produce an increase in the legs 3 and 3′ and a decrease in flux in the legs 2 and 2′. Because the legs 3 and 3′ are saturated, no increase in flux is possible. Consequently, there can be no flux flow at all since magnetic flux flow is necessarily in a closed path. Similarly, during an opposite phase of the compare signal, the magnetomotive force is in a counter-clockwise sense and tends to produce an increase in the flux in legs 2 and 2′. Since legs 2 and 2′ are also saturated, this is again impossible. Therefore, with the transfluxors 604 and 606 in a blocked state, no switching of flux occurs about the small apertures 612 and 618.

If a bit of a binary one value is to be stored in the magnetic logic section 600, the transfluxor 604 is unblocked. This is accomplished by energizing the Y driver 624 to pass a current pulse through the winding 620 in a direction producing a counter-clockwise magnetomotive force about the aperture 610 simultaneous with the application of a pulse signal from the write generator 630 through the compare winding 628 in a direction producing a clockwise magnetomotive force around the aperture 612. If the magnetomotive forces, when combined, are large enough to switch the flux in leg 2, leg 2, following the application of such pulse signals, will be saturated in an upward direction while leg 3 will be saturated in a downward direction. The transfluxor 604 is then unblocked and an alternating magnetomotive force around the small aperture 612 resulting from energizing the compare winding 628 will produce a corresponding flux flow around the aperture 612.

If it is desired to store a bit of a binary zero value in the magnetic logic section 600, the transfluxor 604 is blocked and the transfluxor 606 is unblocked by the simultaneous exciting of the drive winding 620 and the compare winding 628 to produce an upward direction of magnetic flux in the leg 2′ and a downward direction of magnetic flux in the leg 3′. The magnetic states of the transfluxors 604 and 606 to store bits of a binary one and a binary zero value are represented in the first row of the charts of FIGS. 5(*a*) and 5(*b*).

It will be recognized that the write generator 630 must be bidirectional to supply the opposite phase currents for the above procedures.

In addition to the binary input means the cell arrangement illustrated in FIG. 3 includes an output winding 632. The output winding 632 is coupled to the switch section 602 and is interlaced through the small apertures 612 and 618. The output winding 632 is arranged to be responsive only to flux changes in the legs 3 and 3'. In particular, voltage signals are induced in the output winding 632 only if a reversal of flux occurs in either the leg 3 or 3' of the transfluxor 604 and 606, respectively.

In the cell configuration illustrated in FIG. 3, the switch section 602 includes a transistor 634 having its emitter-base junction coupled in series with the output winding 632. By way of example only, the transistor 634 is illustrated as being of a PNP type with its emitter terminal coupled to the output terminal A of the switch section 602 and its collector terminal coupled to the output terminal B of he switch section. Normally the transistor 634 is nonconductive and switches to a conductive state in response to voltage signals induced in the output winding 634 which forward bias the emitter-base junction of the transistor. The conductive and nonconductive states define the low impedance and high impedance states, respectively, for the switch section 602.

As previously described, when a cell is arranged in a series cell configuration, such as illustrated in FIG. 1, it is desired that the switch section be in a low impedance state when a match occurs between the bit of a binary coded input word applied to the cell and the bit of information stored by the cell. Accordingly, for the cell configuration of FIG. 3, when such a match occurs, it is desired that the transistor 634 switch to its conductive state to provide a low impedance, effective short circuit, between the output terminals A and B. To provide such control over the conductive state of the transistor 634, a second binary input means is included. The second binary input means comprises a cell 636 of a compare register of the type illustrated as 46 and 104 in FIGS. 1 and 2, respectively. The cell 636 is coupled to the compare winding 628 and is responsive to a bit of a binary coded input word from a data processor to generate a predetermined alternating signal in the compare winding 628 in response to a bit of a binary one value and a different predetermined alternating signal in response to a bit of a binary one value. The cell 636 may be of conventional design and may include a pair of bidirectional current generators, one responsive to a bit of a binary one value and one responsive to an input bit of a binary zero value.

Figure 4:
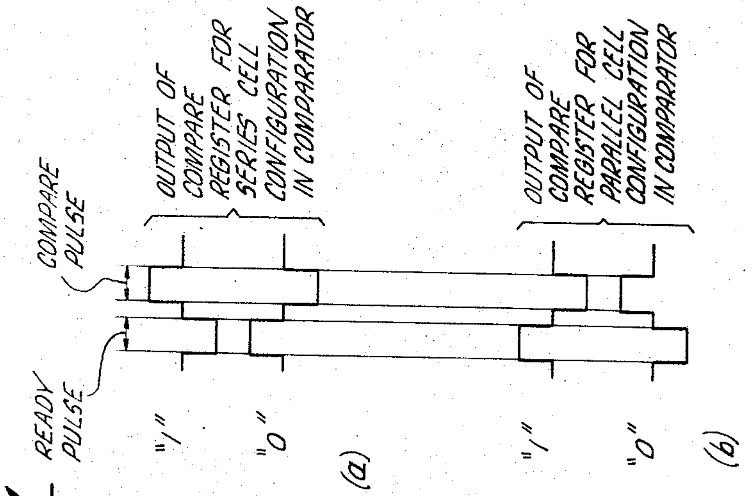
FIG. 4 is a schematic representation of the signal waveforms generated by the compare register for the cell illustrated in FIG. 3.

When the cell illustrated in FIG. 3 is arranged in a series cell configuration (see FIG. 1) the output signals generated by the cell 636 have waveforms as illustrated in FIG. 4(*a*). Thus, in response to a bit of a binary one value the cell 636 generates a negative "ready" current pulse followed by a positive "compare" current pulse. In response to a bit of a binary zero value the cell 636 generates a positive "ready" current pulse followed by a negative "compare" current pulse. The flux states of the transfluxors 604 and 606 in response to the different current signals generated by the cell 636 as well as the resulting impedance state of the transistor 634 are summarized by the chart of FIG. 5(*a*).

Briefly, if the magnetic logic section 600 stores a bit of a binary one value, the transfluxor I is unblocked while the transfluxor II is blocked. If an input bit of binary one value is applied to the cell 636, the direction of magnetic flux about the small aperture 612 reverses during the "ready" current pulse and returns to its original clockwise direction in response to the "compare" pulse. Since the transfluxor II is blocked, no reversal of flux occurs about the small aperture 618. The change of flux during the "compare" pulse about the small aperture 612 induces a voltage in the output winding 632 to forward bias the emitter-base junction of the transistor 634 causing the transistor to momentarily switch to a conductive state. A similar result occurs if the magnetic logic section is storing a bit of binary zero value and an input bit of a binary zero value is applied to the cell 636. In such an instance, a clockwise reversal of flux occurs about the small aperture 618 during the compare portion of the signal generated by the cell 636 to forward bias the emitter-base junction of the transistor 634 causing it to momentarily switch to its conductive state.

If the binary one is stored by the magnetic logic section 600 and a bit of binary zero value is applied to the cell 636, a counter-clockwise reversal of flux occurs about the small aperture 612 during the compare pulse time to reverse bias the emitter-base junction of the transistor 634 causing the transistor to remain in a nonconductive, high impedance state. A similar result occurs if the magnetic logic section 600 stores a bit of binary zero value and an input bit of a binary one value is applied to the cell 636. In such an instance, a counter-clockwise reversal of flux occurs during the compare pulse time about the small aperture 618 to reverse bias the emitter-base junction of the transistor 634. The transistor 634 therefore remains in its nonconductive, high impedance state.

When the system of FIG. 1 includes a plurality of cells of the design illustrated in FIG. 3, the trigger circuit 52 is energized simultaneous with the "compare" pulse being applied to each input circuits 42–45. If a match occurs between each bit of a binary coded input word applied to the compare register 46 and each bit of a binary coded word stored by an information group, the switch section of each cell in the information group is in its low impedance state. The current pulse generated by the signal source 51 then passes through the entire output circuit associated with the information group storing the matching word.

When the cell configuration of FIG. 3 is employed in the system of FIG. 2, it is desired that the transistor 634 be in a nonconductive state when the stored bit matches the bit of an input word applied to the magnetic logic section 600. To provide such control over the impedance state of the transistor 634 when in a parallel cell configuration, the cell 636 is arranged to generate current pulses having the waveform illustrated in FIG. 5(*b*). The results of the application of such current signals to the cell illustrated in FIG. 3 are summarized in the chart of FIG. 5(*b*).

Briefly, if the magnetic logic section 600 stores a bit of a predetermined binary value and if an input bit of the same binary value is applied to the cell 636, a counter-clockwise reversal of magnetic flux occurs about a small aperture of one of the transfluxors to back bias the emitter-base junction of the transistor 634 causing it to remain in its nonconductive state. If the magnetic logic section 600 stores a bit of a predetermined binary value and an input bit of an opposite binary value is applied to the cell 636, a clockwise reversal of magnetic flux occurs about the small aperture of one of the cores to induce a voltage in the output winding 632 which forward biases the emitter-base junction of the transistor 634. Thus, if a match occurs between the stored bit and an input bit, the transistor 634 is in a nonconductive, high impedance state while if a mismatch occurs between the stored bit and an input bit the transistor momentarily switches to a conductive, low impedance state.

When the system of a parallel cell configuration, such as illustrated in FIG. 2, includes a plurality of cells having a design to similar to that illustrated in FIG. 3, the trigger circuit 110 is energized simultaneous with the "compare" pulses being applied to the input circuits 100–103. If a match occurs between the binary coded input word applied to the compare register 104 and a binary coded word stored by one of the information groups, the switch section of each cell in the information group will be in a high impedance state and a current signal will pass through the entire output circuit associated with the information group to provide an indication of a match condition between the input and stored words.

It is to be noted that the binary information stored in the transfluxors I and II of the magnetic logic section 600 is not altered by the "ready" and "compare" signals applied thereto. When a transfluxor is blocked, it remains blocked, and when unblocked it remains unblocked during and after the input signals are generated by the cell 636. Thus, the cell configuration illustrated in FIG. 3 may be interrogated a number of times without destroying the binary coded information stored therein. Therefore, when the system of the present invention comprises cells of the design illustrated in FIG. 3, the stored words may be compared again and again with different binary coded input words without destroying the information stored in an information group. However, if it is desired to change the information stored by any cell, selective energizing of the Y driver 624 and the write generator 630 associated with the cell may produce a reversal of the blocked and unblocked state of the transfluxors in the magnetic logic section 600 to change the value of the binary coded bit of information stored thereby.

Another construction of the memory cell structure of the present invention is illustrated in FIG. 6. The cell includes a magnetic logic section 900 and a switch section 902. The magnetic logic section includes a transfluxor 904 and a magnetic core 906 having an aperture 908. Preferably, but not necessarily, the magnetic core 906 has a substantially rectangular hysteresis characteristic and thus at least two stable magnetic states. In a first stable state magnetic flux is set in a counter-clockwise direction about the aperture 109 while in a second stable magnetic flux is set in a clockwise direction about the aperture.

The transfluxor 904 is similar to the transfluxors 604 and 606 described in connection with FIG. 3. As illustrated, the transfluxor 904 includes a magnetic core element 910 having a substantially rectangular hysteresis characteristic. The core element 910 includes a plurality of apertures 912 and 914 so arranged and proportioned to define three magnetic legs in the core element shown as legs 1, 2, and 3. The aperture 912 is considerably larger than the aperture 914 and is positioned adjacent the left-hand side of the core element 910 as to define leg 1 while the aperture 914 is positioned inwardly of the right edge of the core 910 to define legs 2 and 3 on opposite sides thereof. The aperture 914 is arranged in proportion so that legs 2 and 3 are substantially equal in cross-section while the aperture 912 is proportioned so that the cross-section of leg 1 is equal to or greater than the sum of those of the legs 2 and 3.

Multiple flux paths may then be traced around the apertures 912 and 914. One flux path extends between the legs 1 and 2 around the aperture 912, another path extends around the aperture 914 in legs 2 and 3, while a third flux path extends between legs 1 and 3 around the apertures 912 and 914.

The transfluxor 904 and the core 906 are coupled by an output winding 916. The output winding passes through the aperture 908 of the core 906 and through the small aperture 914 of the transfluxor 904. The output winding 916 is arranged to be responsive to changes in flux in leg 3 of the transfluxor 904 and to changes in the direction of flux in the core 906. Changes in magnetic flux in either the core 906 or leg 3 of the transfluxor 904 induce voltage signals in the output winding 916.

The output winding is coupled to the switch section 902 of the illustrated cell configuration. The switch section 902 includes a transistor 918 having its emitter-base junction coupled in series with the output winding 916. By way of example only, the transistor 918 is of a PNP type having its emitter terminal coupled to the output terminal A of the switch section and its collector terminal coupled to the output terminal B of the switch section. The transistor 918 is normally nonconductive and switches to a conductive state in response to voltage signals induced in the output winding 916 which forward bias the emitter-base junction of the transistor. The conductive and nonconductive states of the transistor 918 define the low and high impedance states of the switch section 902.

Information is stored in the illustrated cell configuration by selectively blocking or unblocking the transfluxor 904. Such control over the state of the transfluxor 904 is provided by a first binary input means. The first binary input includes a drive winding 920 interlaced through the large aperture 912 to control the magnetic flux in leg 1. The drive winding 920 is connected to ground and to a signal source represented in block form at 922 as a Y driver. When a system includes a plurality of the illustrated cell configurations, the drive windings 920 interlaces the large apertures of the transfluxors of the cells of an information group.

The first binary input means also includes a compare winding 924. The compare winding interlaces the small aperture 914 and is connected to a ground and to a signal source represented in block form as a write generator 926. When a system includes a plurality of the illustrated cell configurations the compare winding 924 interlaces the small apertures of the transfluxors of associated cells in the different information groups.

To block the transfluxor 904 of the Y driver 922 is initially energized to develop an intense current pulse in the drive winding 920. The current pulse produces a clockwise flow of flux through the legs 1, 2, and 3, the legs 2 and 3 becoming saturated. This is possible since the larger leg 1 provides a necessary return path. Legs 2 and 3 remain saturated after the termination of the initial pulse since the remnant and saturated inductions are almost equal. In this state the transfluxor 904 is blocked and an alternating signal applied to the compare winding 924 to produce an alternating magnetomotive force along the path surrounding the small aperture 914, if insufficient to produce a flux change about the aperture 912 does not produce a change in the magnetic flux about the small aperture 914. In particular, the alternating magnetomotive force during one phase is in a clockwise sense and tends to produce an increase in flux in leg 3 and a decrease in flux in leg 2. Because leg 3 is saturated, no increase in flux is possible. Similarly, during the opposite phase of the input signal, the magnetomotive force is in a counter-clockwise sense and tends to produce an increase in flux in leg 2. Since leg 2 is also saturated, this is again impossible.

To unblock the transfluxor 904 the Y driver 922 is energized to produce a current pulse in the drive winding 920 in a direction causing a counter-clockwise magnetomotive force to be developed around the aperture 912 simultaneous with the energizing of the write generator 926 to produce a pulse signal in a direction causing a clockwise magnetomotive force around the aperture 914. If the magnetomotive forces, when combined, are of sufficient intensity to switch the flux in leg 2, leg 2 following the application of such pulse signals will be saturated in an upward direction while leg 3 will be saturated in a downward direction. The transfluxor 904 is then unblocked and the application of an alternating magnetometer force around the small aperture 914 resulting from the energizing of the compare winding 924 produces a corresponding flux flow around the small aperture 914 to induce a voltage signal in the output winding 916.

For this discussion it will be assumed that a binary one is stored in the magnetic logic section 900 by an unblocked transfluxor 904 while a binary zero is stored in the magnetic logic section 900 by a blocked transfluxor 904. The state of the transfluxor 904 in storing a binary one and binary zero is illustrated in the first row of the charts of FIGS. 8(*a*) and (*b*). The initial direction of the flux indicated for the core in the first row of the charts of FIGS. 8(*a*) and (*b*) is merely an assumed direction and does not enter into the storage of a bit of a binary information by the magnetic logic section 900.

As previously described, in a memory system including a series cell configuration, such as FIG. 1, it is desired that the switch section of a cell be in its low impedance state when the binary value of a bit stored therein matches the binary value of an input bit applied to the cell. The switch section should also be in its high impedance state when a mismatch occurs. Thus, when the cell design illustrated in FIG. 6 is to be employed in a series cell configuration, the transistor 918 should momentarily switch to a conductive state when a match occurs between the binary value of a stored bit and the binary value of an input bit. If a mismatch occurs the transistor should remain in its nonconductive state. To provide such control over the transistor 918 the illustrated cell configuration includes a second binary input means.

The second binary input means includes the compare winding 924 previously described, an input winding 928 passing through the aperture 908 of the core 906, and a cell 930 of a compare register coupled to the compare winding 924 and the input winding 928. The input winding 928 is terminated at ground and when the illustrated cell design is included in a system passes in a similar manner through the cores of the associated cells in different information groups.

The cell 930 may be of conventional design and comprise one of the cells of the compare register 46 previously described in connection with FIG. 1. In general, the cell 930 includes a plurality of bidirectional current generators responsive to the binary value of a bit of a binary coded input word applied to the cell from a data processor. The cell 930 generates a current signal $I_T$ on the compare winding 924 and a current signal $I_C$ on the input winding 928 in response to the input bit applied to the cell. The waveforms of the current signals $I_C$ and $I_T$ for the illustrated cell design when employed in a series cell configuration are illustrated in FIG. 7. Thus, in response to an input bit of a binary one value the input lead 928 is not energized while the compare winding 924 is energized to pass a positive "ready" current pulse followed by a negative "compare" current pulse. In response to an input bit of a binary zero value, the input lead 928 is energized to pass a positive "ready" current pulse followed by a negative "compare" current pulse while the compare winding 924 is energized to pass a negative "ready" current pulse followed by a positive "compare" current pulse.

The resulting directions of magnetic flux within the transfluxor 904 and the core 906 as well as the resulting impedance states of the transistor 918 for bits of different binary values stored by the magnetic logic section 900 are summarized in the chart of FIG. 8(*a*).

Thus, if a bit of a binary one value is stored in the magnetic logic section 900 and an input bit of a binary one value is applied to the cell 930, a counter-clockwise reversal of magnetic flux occurs about the small aperture 914 during the "ready" pulse applied to the compare winding 924 and a clockwise reversal of magnetic flux occurs about the small aperture 914 during the compare portion of the signal applied to the compare winding 924. Since the input lead 928 is not energized, the direction of magnetic flux remains in its initial state in the core 906. The clockwise reversal of magnetic flux during the compare portion of the signal applied to the compare winding 924 induces a voltage in the output winding 916 sufficient to forward bias the emitter-base junction of the transistor 918 causing the transistor to momentarily switch to a conductive state.

If the magnetic logic section stores a bit of a binary one value and an input bit of a binary zero value is applied to the cell 930, a counter-clockwise reversal of flux occurs about the aperture 914 of the transfluxor 904 during the compare portion of the signal applied to the compare winding 924 to induce a voltage in the output winding 916. Simultaneous with the counter-clockwise switching of the direction of magnetic flux about the small aperture 914, however, a clockwise switching of the direction of magnetic flux occurs within the magnetic core element 906 to induce a voltage in the output winding 916 having a magnitude substantially equal to the voltage induced in the output winding 916 by the reversal of flux about the aperture 914 and of opposite polarity thereto. Thus, a cancellation occurs between the voltages induced in the output winding 916 and the transistor 918 remains in its nonconductive, high impedance state.

If the magnetic logic section stores a binary zero and an input bit of a binary zero value is applied to the cell 930, a clockwise reversal of the direction of magnetic flux occurs in the core 906 during the compare portion of the signal applied to the input winding 928. The clockwise reversal of the direction of magnetic flux induces a voltage signal in the output winding 916 to forward bias the emitter-base junction of the transistor 918. Thus, in turn, momentarily switches the transistor 918 to a conductive, low impedance state.

If a binary zero is stored by the magnetic logic section 900 and an input bit of a binary one value is applied to the cell 930, no reversal in the direction of magnetic flux occurs on either the core 906 or in the transfluxor 904 and hence the transistor 918 remains in its nonconductive, high impedance state.

When a plurality of cells arranged in accordance with the design illustrated in FIG. 6 is included in a system such as illustrated in FIG. 1, the trigger circuit 52 is energized simultaneous with the applying of the "compare" pulses to the input circuits 42, 43, 44, and 45. In such arrangement the input circuits 42, 43, 44, and 45 include include both the compare winding 924 and the input winding 928 for each group of associated cells of the different information groups. If a match occurs between the binary coded input word applied to the compare register 46 and a binary coded word stored by one of the information groups, the switch section of each cell in the information group is in its low impedance state. Therefore, during the compare portion of the input signals applied to the input circuits a current signal generated by the trigger circuit passes through the output circuit associated with the information group to produce a discrete voltage signal at the output terminal thereof. Accordingly, a memory system of series cell configuration, including a plurality of cells of the design illustrated in FIG. 6, indicates a match condition between a coded input word and a coded stored word by the steering of a discrete current signal through the entire output circuit associated with the information group of cells storing the coded word which matches the coded input word.

When the cell design illustrated in FIG. 6 is included in a system wherein the cells are arranged in a parallel configuration, such as illustrated in FIG. 2, a match condition between a stored bit and an input bit is represented by the switch section of the cell being in its high impedance state. A no-match condition is represented by the switch section being in its low impedance state. Thus, for the cell design illustrated in FIG. 6, when included in a system of a parallel cell configuration, when a match occurs between a bit stored in the magnetic logic section and an input bit applied to the compare register, the transistor 918 remains in its nonconductive, high impedance state. If a mismatch occurs the transistor momentarily switches to its conductive, low impedance state.

To provide such control over the impedance state of the transistor 918, the cell 930 of the compare register is arranged to generate electrical signals having the waveforms illustrated in FIG. 7(*b*) in response to input bits of a binary one and a binary zero value, respectively.

The resulting control over the direction of magnetic flux within the transfluxor 904 and the core in response to the input signals illustrated in FIG. 7(*b*) is summarized by the chart of FIG. 8(*b*). Thus, when an input bit of a predetermined value is applied to the cell 930 and the magnetic logic section 900 stores a bit of the same binary value, the transistor 918 remains in its high impedance state. If the magnetic logic section stores a bit of a binary value which differs from the binary value of the input bit applied to the cell 930, the transistor 918 momentarily switches its conductive, low impedance state.

When the system illustrated in FIG. 2 includes a plurality of cells of the design illustrated in FIG. 6, the trigger circuit 110 is excited simultaneous with the applying of the "compare" pulses to the input circuits 100, 101, 102, and 103. The input circuits 100–103 include both the compare winding corresponding to the compare winding 924 and the input windings corresponding to the input windings 928 for each of the associated groups of cells of the different information groups. If a match occurs between the binary coded input applied to the compare register 104 and a binary coded word stored by an information group, the switch section of each cell of the information group is in its high impedance state and a current pulse passes through the associated output lead to produce a voltage at the associated output terminal indicative of the match conditon. Accordingly, a system of a parallel cell configurtaion including a plurality of cells such as illustrated in FIG. 6 indicates a match condition between a coded input word and a coded stored word by the steering of a discrete current signal through the entire output circuit associated with the information group of cells storing the coded word which matches the coded input word.

It is to be noted that the binary information stored by the transfluxor 904 is not altered by the "ready" and "compare" signals applied thereto. When the transfluxor is blocked it remains blocked and when unblocked it remains unblocked during and after the input signals are generated by the cell 930. Thus, the cell configuration illustrated in FIG. 6 may be interrogated a number of times without destroying the binary coded information stored therein. Therefore, when the system of the present invention comprises cells of the design illustrated in FIG. 6, the stored words may be compared again and again with different binary coded input words without destroying the information stored in an information group. However, if it is desired to change the information stored by any cell, selective energizing of the Y driver 922 and the write generator 926 associated with the cell may produce a change in the blocked or unblocked state of the transfluxor 904 to change the value of the binary coded bit of information stored thereby.

What is claimed is:

1. In combination:

a group of memory cells arranged to store a coded word, each cell including a magnetic section and a switch section, the magnetic section of each cell including at least one magnetic storage element for storing a bit of the stored word, an input winding for receiving a bit of an input word, and an output winding coupling the magnetic storage element to the switch section, said magnetic storage element being arranged to induce predetermined electrical signals in said output winding in response to the reception of a corresponding bit of said input word, the switch section of each cell having a high impedance and a low impedance state and being responsive to the electrical signals induced in the output winding of an associated magnetic section for switching between said high and low impedance states such that said switch section is in a predetermined one of said states in response to a signal induced in said output winding when the input bit applied to the input winding of said associated magnetic section matches the bit stored in said associated magnetic section;

a common output circuit coupled to the switch section of each cell;

and means for applying a bit of a coded input word to the input winding of each corresponding cell to control the state of each of the cells such that a series path is provided for a current signal through the entire output circuit only when the coded input word exactly matches the stored word.

2. In combination:

a group of memory cells arranged to store a coded word, each cell including a magnetic section and a switch section, the magnetic section of each cell including at least one magnetic storage element for storing a bit of the stored word, an input winding for receiving a bit of an input word, and an output winding coupling the magnetic storage element to the switch section, said magnetic storage element being arranged to induce predetermined electrical signals in said output winding in response to said bit of said input word, the switch section of each cell having a high impedance and a low impedance state and being responsive to the electrical signals induced in the output winding of an associated magnetic section for switching between said high and low impedance states such that said switch section is in a predetermined one of said states in response to a signal induced in said output winding when the input bit applied to the input winding of said associated magnetic section matches the bit stored in said associated magnetic section;

a signal source;

an output circuit coupled between the signal source and an output terminal and to the switch section of each cell;

and means for applying a different bit of a coded input word to the input winding of each cell to control the state of each of the cells whereby a discrete current signal generated by the signal source passes through said output circuit to said output terminal only if the input word matches the stored word.

3. A comparator, comprising:

a plurality of groups of memory cells for storing a plurality of coded words, one word being stored in each group, each cell of each group storing a predetermined bit of the stored word and each cell being associated with a corresponding cell of each other group of cells, each cell including a magnetic section and a switch section, the magnetic section of each cell including at least one magnetic storage element for storing a particular bit of a stored word, an input winding for receiving a bit of an input word, and an output winding coupling the magnetic storage element to the switch section of the cell, said magnetic storage element inducing predetermined electrical signals in said output winding in response to said bit of said input word, the switch section of each cell having a high impedance and a low impedance state and being responsive to the electrical signals induced in the output winding of an associated magnetic section for switching between said high and low impedance states such that said switch section is in a predetermined one of aid states in response to a signal induced in said output winding when the input bit applied to said associated magnetic section matches the bit stored in said associated magnetic section;

an input circuit for each cell of a group of cells, each input circuit including a series connection of input windings of each cell associated with said cell of said group of cells;

a plurality of output circuits, one associated with each group of cells and each coupled to the switch section of each cell in the associated group of cells;

a signal source coupled in common to the plurality of output circuits;

and means for applying a different bit of a coded input word to each input circuit to control the state of the cells of each group of cells whereby a current signal generated by the signal source only passes through the output circuit associated with the group of cells storing a word which exactly matches the coded input word.

4. In a comparator, the combination of:

a group of memory cells arranged to store a binary coded word, each cell including a magnetic section and a switch section, the magnetic section of each cell including a magnetic storage element for storing a particular bit of the stored word, an input winding for receiving an input signal indicative of the binary value of a bit of a binary coded input word, and an output winding coupling the magnetic storage element to the switch section of the cell, said magnetic storage element being arranged to induce predetermined electrical signals in said output winding in response to said input signal, the switch section of each cell having a high impedance and a low impedance state and being responsive to the electrical signals induced in the output winding of an associated magnetic section for switching between said high and low impedance such that said switch section is in a predetermined one of said states in response to a signal induced in said output winding when the binary value of the input signal applied to said associated magnetic section matches the binary value of the bit stored in said associated magnetic section;

first binary input means for storing said binary coded word in said group of cells including means for setting magnetic flux in different predetermined directions to store a binary one and a binary zero in the magnetic storage elements of the cells whereby a different bit of said binary coded word is stored by each magnetic storage element;

a common output circuit coupled to the switch section of each cell;

and second binary input means for applying an input signal indicative of the binary value of a different bit of a binary coded input word to the input winding of each cell whereby a series path is provided for a current signal through the output circuit only when said binary coded input word exactly matches said binary coded stored word.

5. The apparatus defined by claim 4 wherein said output circuit includes means for coupling the switching section of each cell in series.

6. The apparatus defined by claim 4 wherein said output circuit includes an output lead and means for coupling the switch sections of the cells in parallel between said output lead and a reference point.

7. In a memory, comprising:

a plurality of groups of memory cells for storing a plurality of binary coded words, one word being stored in each group, each cell of each group storing a predetermined bit of the binary coded word stored by said group and each cell being associated with a particular cell of each other group of cells, each cell including a magnetic section and a switch section, the magnetic section of each cell including a magnetic storage element for storing a particular bit of a stored word, an input winding for receiving an input signal indicative of the binary value of a bit of a binary coded input word, and an output winding coupling the magnetic storage element to the switch section of the associated cell, said magnetic storage element being arranged to induce predetermined electrical signals in said output winding in response to said input signal, the switch section of each cell having a high impedance and a low impedance state and being responsive to the electrical signals induced in the output winding of an associated magnetic section for switching between said high and low impedance states such that such switch section is in a predetermined one of said states in response to a signal induced in said output winding when the binary value of the input signal applied to the input winding of said associated magnetic section matches the binary value of the bit stored in said associated magnetic section;

an input circuit for each cell of the group of cells, each input circuit including a series connection of the input windings of each cell associated with said cell of said group of cells;

a plurality of output circuits one associated with each group of cells and each coupled to the switch section of each cell of the associated group of cells;

a signal source coupled in common to the plurality of output circuits;

first binary input means for storing a binary coded word in each group of cells including means for setting magnetic flux in different predetermined directions to store a binary one and a binary zero in the magnetic element of the cells whereby a different one of each stored word is stored by each magnetic storage element of the group of cells storing the word;

and second binary input means for applying a signal indicative of the binary value of a different bit of a binary coded input word to each input circuit to control the state of the cells of each group of cells whereby a discrete current signal generated by the signal source passes only through the output circuit associated with the group of cells storing a binary coded word which exactly matches the binary coded input word.

8. The apparatus defined in claim 7 wherein each output circuit of said plurality of output circuits includes means for coupling the switch section of each cell of the associated group of cells in series.

9. The apparatus defined in claim 7 wherein each output circuit of said plurality of output circuits includes an output lead and means for coupling the switch section of each cell of an associated group of cells in parallel between said output lead and a reference point and wherein said signal source is coupled in common to the output lead of each output circuit.

10. In a comparator for simultaneously comparing a binary coded input word with a plurality of binary coded stored words, a cell comprising:

first and second magnetic cores having substantially rectangular hysteresis characteristics and each including a plurality of apertures for defining first, second, and third legs in each core to establish a pair of controllable flux paths of substantially different lengths linking the legs of each core, said cores being respectively blocked and unblocked and unblocked and blocked to store a binary one and a binary zero;

first binary input means coupled to said first and second magnetic cores for selectively controlling the states of the cores to store a binary one and a binary zero by alternatively blocking one core and unblocking the other core to effect the storage of the desired binary bits, second binary input means including an input winding linking said first and second cores and responsive to a binary coded input signal for switching the direction of flux in at least the third leg of the unblocked one of said cores to establish a first direction of magnetic flux in the third leg of said unblocked core in response to a binary one and for establishing an opposite direction of magnetic flux in the third leg of said unblocked core in response to a binary zero;

an output winding linking said first and second cores for sensing changes in the direction of flux in the third legs of said first and second cores, said changes in magnetic flux inducing electrical signals in said output windings;

and a switch element coupled to said output winding and having a high impedance and a low impedance state and being responsive to the electrical signals induced in said output winding for switching between said high and low impedance states to be in a predetermined one of said states in response to a signal induced in said output winding when the binary value of said input signal applied through said first binary input means and stored in said cores matches the binary value of the bit stored by said first and second cores whereby the predetermined state of the switch element after the application of the binary input signals to the input winding of said second binary input means signals the matching condition of the input bit applied to the first binary input means and the stored bit.

11. The apparatus defined in claim 10 wherein said switch element includes a single transistor having its emitter-base junction coupled in series with said output winding such that the signals induced in said output winding control the conductive state of said transistor.

12. In a comparator, the combination of:

a plurality of memory cells arranged to store a binary coded word, each cell including a magnetic logic section and a switch section, the magnetic logic section of each cell including first and second magnetic cores having substantially rectangular hysteresis characteristics and each including a plurality of apertures for defining first, second, and third legs in each magnetic core to establish a pair of controllable flux paths of substantially different lengths linking the legs of each core, said cores being respectively blocked and unblocked and unblocked and blocked to store a binary one and a binary zero, an input winding linking said first and second cores for receiving input signals representative of the binary value of a bit of a binary coded input word for switching the direction of flux in at least the third leg of the unblocked one of said first and second cores to establish one direction of magnetic flux in the third leg of said unblocked core in response to an input signal of a binary one value and for establishing an opposite direction of magnetic flux in said third leg in response to an input signal of a binary zero value, and an output winding coupled to the switch section and linking the first and second cores for sensing changes in the direction of magnetic flux in the third legs of said first and second cores, said changes in magnetic flux inducing electrical signals in said output winding, the switch section of each core having a high impedance and a low impedance state and being responsive to electrical signals induced in the output winding of an associated magnetic section for switching between said high and low impedance states such that said switch section is in a predetermined one of said states in response to a signal induced in said output winding when the binary value of the input signal applied to the input winding of said associated magnetic section matches the binary value of the bit stored in said associated magnetic section;

a common output circuit coupled to the switch section of each cell;

and binary input means responsive to a binary coded input word for applying an input signal indicative of the binary value of a different bit of the binary coded input word to the input winding of each cell whereby a series path is provided for a current signal through the entire output circuit only when said binary coded input word matches said binary coded stored word.

13. The apparatus defined by claim 12 including a signal source coupled to said output circuit for applying a current signal to said output circuit substantially simultaneous to the application of the input signals to the input windings.

14. The apparatus defined by claim 12 wherein the switch section of each cell includes a transistor having its emitter-base junction coupled in series with the output winding of the associated magnetic section such that the electrical signals induced in said output winding control the conductive state of said transistor.

15. The apparatus defined by claim 12 wherein said output circuit includes means for coupling the switch section of each cell in series.

16. The apparatus defined by claim 12 wherein said output circuit includes an output lead and means for coupling the switch sections of the cells in parallel between said output lead and a reference point.

17. In combination:

a plurality of memory cells arranged to store a binary coded word, each cell including a magnetic logic section and a switch section, the magnetic logic section of each cell including first and second magnetic cores having substantially rectangular hysteresis characteristics and each including a plurality of apertures for defining first, second, and third legs in each core to establish a pair of controllable flux paths of different lengths linking the legs on each core, said cores being respectively blocked and unblocked and unblocked and blocked to store a binary one and a binary zero, an input winding linking the first and second cores for receiving an input signal indicative of the binary value of a bit of a binary coded input word for switching the direction of flux in at least the third leg of the unblocked one of the first and second cores to establish one direction of magnetic flux in the third leg of said unblocked core in response to an input signal of a binary one value and for establishing an opposite direction of magnetic flux in said third leg in response to an input signal of a binary zero value, an output winding coupled to the magnetic section and linking the first and second cores for sensing changes in the direction of magnetic flux in the third legs of said cores, said changes in magnetic flux inducing electrical signals in said output winding, the switch section of each cell having a high impedance and a low impedance state and being responsive to the electrical signals induced in the output winding of an associated magnetic section for switching between said high and low impedance states such that said switch section is in a predetermined one of said states in response to a signal induced in said output winding when the binary value of the input signal applied to the input winding of said associated magnetic section matches the binary value of the bit stored in said associated magnetic section;

first binary input means for storing a binary coded word in said plurality of cells including means for selectively blocking and unblocking the first core of each cell and for selectively unblocking and blocking the second core of each cell to store a binary one and a binary zero in the magnetic section of each cell whereby a different bit of said binary coded word is stored by each magnetic section;

an output circuit coupled to the switch section of each cell;

and second binary input means responsive to a binary coded input word for applying an input signal indicative of the binary value of a different bit of said binary coded input word to the input winding of each cell whereby a series path is provided for a current signal through the entire output circuit only when said binary coded input word matches said binary coded stored word.

18. In combination:

a plurality of cells arranged to store a binary coded word, each cell including a magnetic logic section and a switch section, the magnetic logic section of each cell including first and second magnetic cores, said first core having a substantially rectangular hysteresis characteristic and a plurality of apertures for defining first, second, and third legs in said first core to establish a pair of controllable flux paths of substantially different lengths linking said legs, said first magnetic core being blocked and unblocked to store a binary one and a binary zero bit, a first input winding coupled to said first core for receiving a first input signal indicative of the binary value of a bit of a binary coded input word for switching the direction of flux in at least a third leg of said first core when unblocked to establish a first direction of magnetic flux in said third leg when said first input signal is in a binary one value and for establishing an opposite direction of magnetic flux in said third leg when said first input signal is of a binary zero value, a second input winding coupled to said second core for receiving a second input signal indicative of the binary value of said bit of said binary coded input word for switching the direction of flux in said second core when said second input signal is of a predetermined binary value, and an output winding coupled to the switch section of the associated cell and linking said first and second cores for sensing changes in the direction of flux in said third leg and in said second core, said changes in magnetic flux inducting electrical signals in said output winding, the switch section of each core having a high impedance and a low impedance state and being responsive to said electrical signals induced in the output winding of an associated magnetic section for switching between said high and low impedance states such that said switch section is in a predetermined one of said states in response to a signal induced in said output winding when the binary value of the bit of said coded input word applied to said associated magnetic section matches the binary value of said bit stored in the first magnetic core of said associated magnetic section;

a common output circuit coupled to the switch section of each cell;

and binary input means responsive to a binary coded input word for applying a first and a second input signal indicative of the binary value of a different bit of said binary coded input word to the first and second input windings of each cell whereby a series path is provided for a current signal through the entire output circuit only when said binary coded input word matches said binary coded stored word.

19. The apparatus defined by claim 18 including a signal source coupled to said output circuit for applying a current signal to said output circuit substantially simultaneous to the application of the input signals to the input windings.

20. The apparatus defined by claim 18 wherein the switch section of each cell includes a transistor having its emitter-base junction coupled in series with the output winding of the associated magnetic section such that the electrical signals induced in said output winding control the conductive state of said transistor.

21. In combination:

a plurality of cells arranged in an information group to store a binary coded word, each cell including a magnetic logic section and a switch section, the magnetic logic section of each cell including first and second magnetic cores, said first core having a substantially rectangular hysteresis characteristic and a plurality of apertures for defining first, second, and third legs in said first core to establish a pair of controllable flux paths of substantially different lengths linking said legs, said first magnetic core being blocked and unblocked to store a binary one and a binary zero bit, a first input winding coupled to said first core for receiving a first input signal indicative of the binary value of a bit of a binary coded input word for switching the direction of flux in at least a third leg of said first core when unblocked to establish a first direction of magnetic flux in said third leg when said first input signal is in a binary one value and for establishing an opposite direction of magnetic flux in said third leg when said first input signal is of a binary zero value, a second input winding coupled to said second core for receiving a second input signal indicative of the binary value of said bit of said binary coded input word for switching the direction of flux in said second core when said second input signal is of a predetermined binary value, and an output winding coupled to the switch section of the associated cell and linking said first and second cores for sensing changes in the direction of flux in said third leg and in said second core, said changes in magnetic flux inducing electrical signals in said output winding, the switch section of each core having a high impedance and a low impedance state and being responsive to the electrical signals induced in the output winding of a low impedance states such that said switch section is in a predetermined one of said states in response to a signal induced in said output winding when the binary value of the bit of said coded input word applied to said associated magnetic section matches the binary value of said bit stored in the first magnetic core of said associated magnetic section;

an output circuit coupled to the switch section of each cell;

a first binary input means for storing a binary coded word in the plurality of cells including means for blocking and unblocking the first magnetic core of each cell to store a binary one and a binary zero whereby a different bit of said binary coded word is stored by each first magnetic core;

and second binary input means responsive to a binary coded input word for applying a first and a second input signal indicative of the binary value of a different bit of said binary coded input word to the first and second windings of each cell whereby a series path is provided for a current signal through the entire output circuit only when said binary coded input word matches said binary coded stored word.

References Cited

UNITED STATES PATENTS

| | | | |
|---|---|---|---|
| 2,983,906 | 5/1961 | Crane | 340—174 |
| 3,044,044 | 7/1962 | Lee | 340—174 |
| 3,085,232 | 4/1963 | Lamy | 340—174 |
| 3,104,380 | 9/1963 | Haibt | 340—174 |
| 3,221,157 | 11/1965 | Fleisher et al. | 340—173 |

BERNARD KONICK, *Primary Examiner.*

S. M. URYNOWICZ, *Assistant Examiner.*